(12) United States Patent
Hung et al.

(10) Patent No.: US 12,732,465 B2
(45) Date of Patent: Sep. 8, 2026

(54) POLICING NETWORK TRAFFIC ON INTERFACES ACROSS MULTIPLE PROCESSING ELEMENTS

(71) Applicant: Arista Networks, Inc., Santa Clara, CA (US)

(72) Inventors: Denny Hung, Cupertino, CA (US); Bojun Wang, Fremont, CA (US); Ethan Robert Vadai, San Jose, CA (US); Wenjun Chen, Santa Clara, CA (US); Muhammad Yousuf, San Jose, CA (US); Steven Walter Ulrich, Minneapolis, MN (US); Michael Kerby Chen, Palo Alto, CA (US)

(73) Assignee: Arista Networks, Inc., Santa Clara, CA (US)

( * ) Notice: Subject to any disclaimer, the term of this patent is extended or adjusted under 35 U.S.C. 154(b) by 19 days.

(21) Appl. No.: 18/757,406

(22) Filed: Jun. 27, 2024

(65) Prior Publication Data

US 2026/0005968 A1 Jan. 1, 2026

(51) Int. Cl.

*H04L 47/20* (2022.01)
*H04L 41/0816* (2022.01)
*H04L 47/122* (2022.01)

(52) U.S. Cl.

CPC .......... *H04L 47/20* (2013.01); *H04L 41/0816* (2013.01); *H04L 47/122* (2013.01)

(58) Field of Classification Search

CPC .... H04L 41/0816; H04L 47/122; H04L 47/20
See application file for complete search history.

(56) References Cited

U.S. PATENT DOCUMENTS

| | | | | |
|---|---|---|---|---|
| 8,495,725 | B2 * | 7/2013 | Ahn | H04L 63/0227 726/11 |
| 9,088,544 | B1 * | 7/2015 | Pan | H04L 63/0209 |
| 9,485,118 | B1 * | 11/2016 | Atlas | H04L 47/25 |
| 9,559,800 | B1 * | 1/2017 | Giles | H04J 13/18 |
| 10,122,735 | B1 * | 11/2018 | Wohlgemuth | H04L 63/1408 |
| 12,388,758 | B1 * | 8/2025 | Torretta | H04L 47/22 |
| 2014/0025736 | A1 * | 1/2014 | Wang | H04L 45/245 709/204 |
| 2023/0077594 | A1 * | 3/2023 | Hung | H04L 47/20 370/235 |

* cited by examiner

*Primary Examiner* — Jason D Recek
(74) *Attorney, Agent, or Firm* — Treyz Law Group, P.C.; Tianyi He

(57) ABSTRACT

A network device may include control plane processing circuitry configured to obtain packet-processing-element-specific policer profiles for applying a traffic policy to a logical interface formed from physical interfaces coupled to different packet processing elements. Each of the packet processing elements may be configured to process matching network traffic using its policer configured based on the corresponding packet-processing-element-specific policer profile. The packet processing elements may thereby collectively apply the traffic policy in the intended manner.

20 Claims, 6 Drawing Sheets

POLICING NETWORK TRAFFIC ON INTERFACES ACROSS MULTIPLE PROCESSING ELEMENTS

BACKGROUND

A communications system can include network devices that are interconnected to form a network for conveying network traffic from source devices to destination devices. To appropriately process network traffic received at a network device, the network device can apply traffic policies to manipulate the received network traffic to achieve the desired network traffic handling behavior. As one example, an illustrative traffic policy can enforce a traffic rate limit for matching network traffic.

DETAILED DESCRIPTION

A network may include interconnected network devices that convey network traffic between end hosts or generally between devices. Network traffic received by a network device may be processed in a number of ways. As an example, a network device may be configured to apply a traffic policy by taking one or more actions on a matching portion of the received network traffic. Configurations in which the one or more actions include one or more actions to police matching network traffic, e.g., to enforce a traffic rate limit for the matching network traffic, are sometimes described herein as illustrative examples.

In particular, control plane processing circuitry of the network device may obtain a traffic policy defining one or more matching criteria and defining one or more corresponding actions to be taken on matching network traffic. The control plane processing circuitry may further obtain interfaces such as a logical interface (e.g., a port channel interface, a port channel subinterface, a switch virtual interface, etc.) on which the traffic policy is to be applied. Because logical interfaces may be formed from underlying physical interfaces (e.g., implemented using physical ports) coupled to different packet processing elements (e.g., different packet processors, different packet processor cores, etc.), if care is not taken, the traffic policy for the logical interface may not be properly applied across the multiple packet processing elements.

To properly apply the traffic policy for a particular logical interface, the control plane processing circuitry may obtain (e.g., generate) packet-processing-element-specific traffic policy profiles each applicable to one or more corresponding packet processing elements (e.g., based on the number of physical interface(s) of the logical interface coupled to that packet processing element). Accordingly, the packet processing elements may each be appropriately configured with the corresponding packet-processing-element-specific traffic policy profile, thereby collectively implementing the behavior intended by applying the traffic policy to the logical interface. Various details for applying traffic policies to logical interfaces are further described herein.

Figure 1:
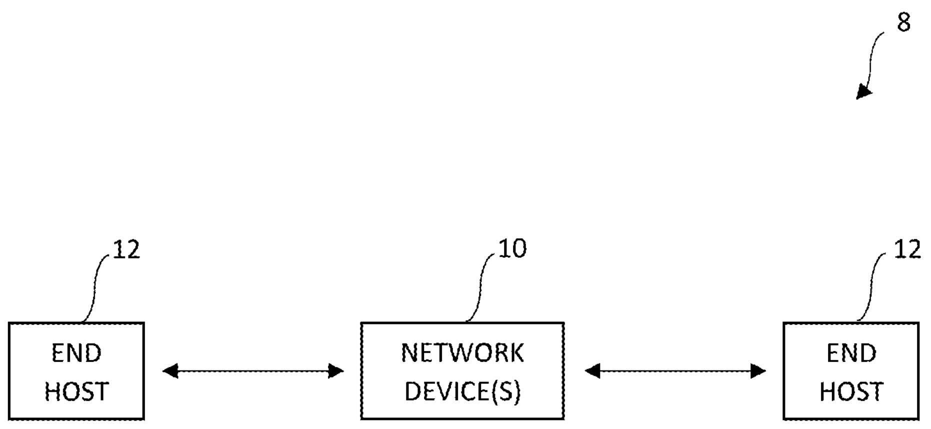
FIG. 1 is a diagram of an illustrative networking system having one or more network devices in accordance with some embodiments.

An illustrative networking system in which network devices apply traffic policies to process network traffic (e.g., in the manner described above) is shown in FIG. 1. In the example of FIG. 1, the networking system may include a communications network 8. Network 8 may be implemented to span various geographical locations or generally be implemented with any suitable scope. As examples, network 8 may include, be, and/or form part of one or more local segments, one or more local subnets, one or more local area networks (LANs), one or more campus area networks, a wide area network, etc. In general, network 8 may include one or more wired portions with network devices interconnected based on wired technologies or standards such as Ethernet (e.g., using copper cables and/or fiber optic cables) and, if desired, one or more wireless portions implemented by wireless network devices (e.g., to form wireless local area networks (WLANs)). If desired, network 8 may include internet service provider networks (e.g., the Internet) or other public service provider networks, private service provider networks (e.g., multiprotocol label switching (MPLS) networks), and/or may include other types of networks such as telecommunication service provider networks.

Network 8 can include networking equipment forming a variety of network devices that interconnect and convey network traffic between devices such as end hosts. These network devices of network 8 such as network device(s) 10 may each be a switch (e.g., a multi-layer (Layer 2 and Layer 3) switch or a single-layer (Layer 2) switch), a bridge, a router, a gateway, a hub, a repeater, a firewall, a wireless access point, a network device serving other networking functions, management equipment that manages and controls the operation of one or more of these network devices, a network device that includes the functionality of two or more of these devices, or another type of network device.

Network devices(s) 10 of network 8 may receive network traffic from one or more end hosts 12 and may appropriately process the received network traffic to forward the network traffic to one or more end hosts 12. Host devices or host equipment that implement end hosts 12 of network 8 may include computers, servers, portable electronic devices such as cellular telephones and laptops, other types of specialized or general-purpose host computing equipment (e.g., running one or more client-side and/or server-side applications), network-connected appliances or devices that serve as input-output devices and/or computing devices in a distributed networking system, devices used by network administrators (sometimes referred to as administrator devices), network service or analysis devices, management equipment that manages and controls the operation of one or more of other end hosts and/or network devices, and/or other types of devices or equipment. In some instances, network device(s) 10 may also receive and process network traffic that originates from (e.g., is generated by) network devices (e.g., some peer network devices 10) and/or from other network elements of network 8.

Figure 2:
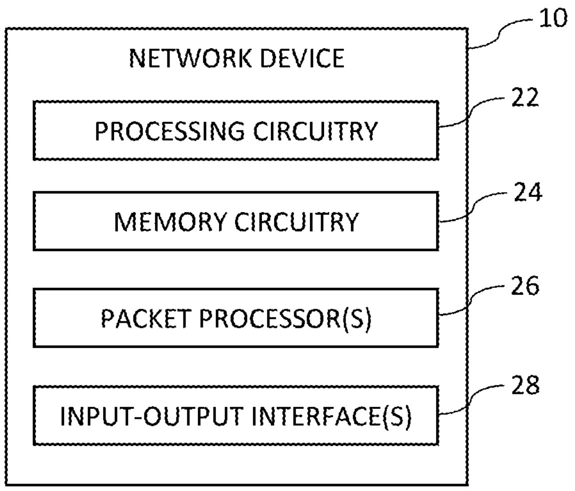
FIG. 2 is a diagram of an illustrative network device in accordance with some embodiments.

FIG. 2 is a diagram of an illustrative implementation of a network device. Configurations in which a network device of the type described in connection with FIG. 2 implements one or more of network device(s) 10 in FIG. 1 are described herein as an example.

As shown in FIG. 2, network device 10 may include processing circuitry 22, memory circuitry 24, one or more packet processors 26, and input-output interfaces 28 (e.g., formed using interface circuitry and one or more physical ports). In one illustrative arrangement, network device 10 may be or form part of a modular network device system (e.g., a modular switch system having removably coupled modules usable to flexibly expand characteristics and capabilities of the modular switch system such as to increase ports, provide specialized functionalities, etc.). In another illustrative arrangement, network device 10 may be a fixed-configuration network device (e.g., a fixed-configuration switch having a fixed number of ports and/or a fixed hardware configuration).

Processing circuitry 22 may include one or more processors such as central processing units (CPUs), graphics processing units (GPUs), microprocessors, general-purpose processors, host processors, microcontrollers, digital signal processors, programmable logic devices such as field programmable gate array (FPGA) devices, application specific system processors (ASSPs), application specific integrated circuit (ASIC) processors, and/or other types of processors.

Processing circuitry 22 may run (e.g., execute) a network device operating system and/or other software/firmware that is stored on memory circuitry 24 communicatively coupled to and accessible by processing circuitry 22. Memory circuitry 24 may include one or more non-transitory (tangible) computer-readable storage media that store the operating system software and/or any other software code, sometimes referred to as program instructions, software, data, (computer-executable) instructions, or code. As an example, the operations for obtaining, applying, managing, and/or otherwise handling traffic policies as described herein and performed by network device 10 may be stored as instructions on the one or more non-transitory computer-readable storage media (e.g., in portion(s) of memory circuitry 24). The corresponding processing circuitry (e.g., one or more processors of processing circuitry 22) may process (e.g., execute) the respective instructions to perform the operations for handling traffic policies.

Memory circuitry 24 may include non-volatile memory (e.g., flash memory, electrically-programmable read-only memory, a solid-state drive, hard disk drive storage, etc.), volatile memory (e.g., static random-access memory or dynamic random-access memory), removable storage devices (e.g., storage devices removably coupled to device 10), and/or other types of memory circuitry.

Processing circuitry 22 and at least the portion(s) of memory circuitry 24 as described above may sometimes be referred to collectively as control circuitry (e.g., collectively implementing a control plane of network device 10). Accordingly, processing circuitry 22 may sometimes be referred to as control plane processing circuitry 22 or control plane processor(s) 22. As just a few examples, processing circuitry 22 may execute network device control plane software such as operating system software, routing policy management software, routing protocol agents or processes, routing information base agents, and other control software, may be used to support the operation of protocol clients and/or servers (e.g., to form some or all of a communications protocol stack such as an Internet Protocol (IP) and Transmission Control Protocol (TCP) stack), may be used to support the operation of packet processor(s) 26, may store packet forwarding information, may execute packet processing software, and/or may execute other software instructions that control the functions of network device 10 and the other components therein.

Packet processor(s) 26 may be used to implement a data plane or forwarding plane of network device 10 and may therefore sometimes be referred to herein as data plane processor(s) 26 or data plane processing circuitry 26. Packet processor(s) 26 may include one or more processors such as programmable logic devices (e.g., field programmable gate array (FPGA) devices), application specific system processors (ASSPs), application specific integrated circuit (ASIC) processors, central processing units (CPUs), graphics processing units (GPUs), microprocessors, general-purpose processors, host processors, microcontrollers, digital signal processors, and/or other types of processors.

A packet processor 26 may receive incoming (ingress) network traffic via network interfaces 28 implemented on exterior-facing ports (and/or via internal interfaces), parse and analyze the received network traffic, process the network traffic based on traffic processing decision data (e.g., packet forwarding decision data in forwarding information bases, in routing information bases, and/or in other types of routing tables, data in accordance with network protocol(s), and/or data in accordance with a forwarding or other network policy such as an access control list (ACL) policy), and selectively modify and forward (or drop) the network traffic based on the traffic processing decision data.

To interact with external devices, external systems, and/or users, network device 10 may include input-output interfaces 28 formed from corresponding input-output devices (sometimes referred to as input-output circuitry or interface circuitry). Input-output interfaces 28 may include different types of communication interfaces such as Ethernet interfaces (e.g., formed from one or more Ethernet ports), optical interfaces (e.g., formed from removable optical modules containing optical transceivers), Bluetooth interfaces, Wi-Fi interfaces, and/or other network interfaces for connecting device 10 to the Internet, a local area network, a wide area network, a mobile network, generally network device(s) in these networks, and/or other computing equipment (e.g., end hosts, server equipment, user devices, etc.).

Some input-output interfaces 28 (e.g., those based on wireless communication) may be implemented using wireless communication circuitry (e.g., antennas, radio-frequency transceivers, radios, etc.). Some input-output interfaces 28 (e.g., those based on wired communication) may be implemented using physical ports (sometimes referred to as physical interfaces). These physical ports may be configured to physically couple to and/or electrically connect to corresponding mating connectors of external components or equipment (e.g., cables, pluggable optical transceiver modules, etc.). Different ports may have different form-factors to accommodate different cables, different modules, different devices, or generally different external equipment.

To facilitate the processing of network traffic received via physical interfaces (e.g., physical ports on which interfaces 28 are implemented), control plane processing circuitry 22 may obtain and apply a traffic policy that is enforced using packet processors 26. In particular, each packet processor 26 may include one or more packet processing elements (e.g., packet processing cores or packet processing units) that operate independently to process network traffic received from different physical interfaces. Configurations in which the traffic policy defines one or more policer actions (e.g., a traffic rate-limiting action) to be taken on matching network traffic are sometimes described herein as an illustrative example. The packet processing elements may each be configured to implement a corresponding policer to perform these policer actions.

Figure 3:
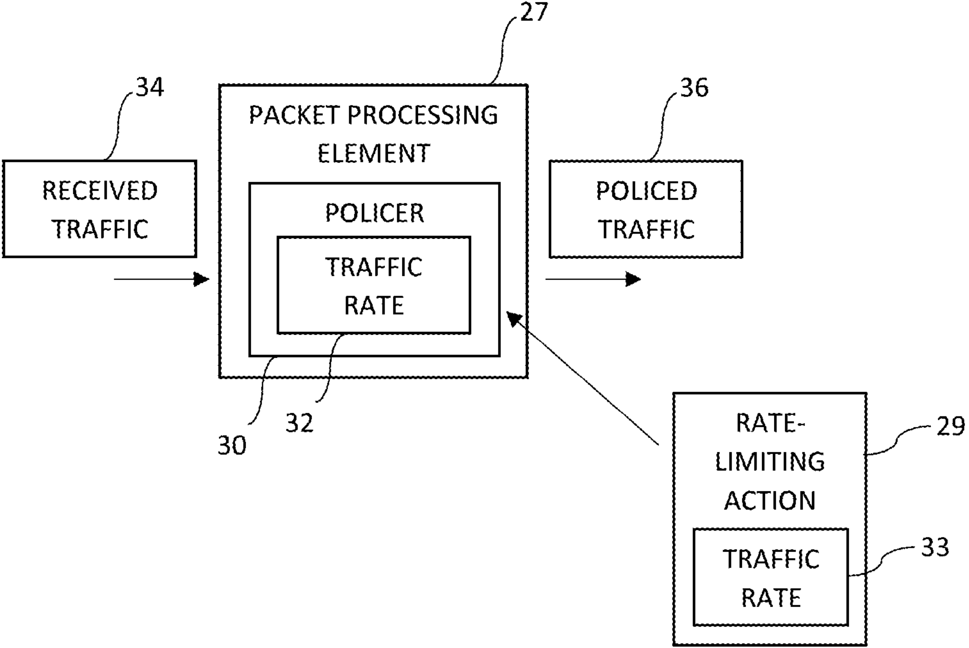
FIG. 3 is a diagram of an illustrative packet processing element configured to police network traffic in accordance with some embodiments.

FIG. 3 is a diagram of an illustrative packet processing element 27 (e.g., a packet processing core of packet processor 26) configured to perform a traffic rate-limiting operation. As shown in FIG. 3, a packet processing element 27 may be configured to provide (e.g., implement) a policer such as policer 30 (e.g., based on a rate-limiting action 29 part of a traffic policy rule at least partly enforced by the packet processing element 27). Policer 30 may be implemented with a particular traffic rate 32 to which traffic meeting certain matching criteria (of the corresponding traffic policy rule) should be limited. This traffic rate 32 may be the same as traffic rate 33 specified as part of the traffic policy rule (e.g., as part of rate-limiting action 29 of the traffic policy rule).

In the example of FIG. 3, packet processing element 27 may receive, via a physical interface coupled to packet processing element 27, network traffic 34 that matches the criteria for policing. In other words, network traffic 34 may belong to the network flow identified by the traffic policy rule for which output traffic such as traffic 36 should comply with any policing rules. In this case, packet processing element 27 may rate-limit output traffic 36 to a maximum traffic rate of traffic rate 32.

As an illustrative example, policer 30 may enforce a traffic rate 32 of 15 Megabits per second (Mbps). Packet processing element 27 may receive traffic 34, e.g., packets, at a first rate of 20 Mbps. Packet processing element 27 (e.g., implementing policer 30) may drop a number of packets (e.g., a quarter of received packets) in the network flow such that the traffic rate 32 of 15 Mbps is satisfied for the network flow. If desired, packet processing element 27 may delay the transmission of a number of packets (e.g., buffering the number of packets for a period of time, etc.) and/or may take any other suitable actions, in addition to or instead of dropping the number of packets, to comply with the traffic rate 32 for the network flow. Accordingly, packet processing element 27 may output traffic 36 in the traffic flow at an output traffic rate of 15 Mbps (or less).

While an illustrative packet processing element 27 that polices traffic received via a physical interface based on a traffic policy applied to the physical interface is described in connection with of FIG. 3, a network device such as network device 10 may be configured with one or more logical interfaces to which the same type of traffic policy rule (e.g., specifying rate-limiting action 29) may be applied. Unlike a single physical interface (e.g., a single interface 28), a logical interface may be formed from multiple underlying physical interfaces (e.g., multiple interfaces 28) coupled to different packet processing elements 27 (e.g., packet processing cores, packet processing units, etc.) of the same packet processor 26 and/or of different packet processors 26.

Performing the same type of configuration done for the single physical interface (as described above in connection with FIG. 3) and simply duplicating the configuration across multiple physical interfaces may not achieve the desired behavior to apply the traffic policy to the logical interface.

Consider as an example a traffic policy to be applied to a logical interface such that a network flow received through the logical interface (e.g., any of the underlying physical interfaces) is rate-limited by an action defined in the traffic policy. Because the traffic policy is centrally managed (e.g., by control plane processing circuitry) and the centrally managed traffic policy (e.g., a global policer rule and parameter(s), such as a global traffic-limiting rate, therein) is typically referenced by all of the packet processing elements 27, a global traffic-limiting rate or a collective or overall policy traffic-limiting rate (e.g., rate 33) may be used to configure the policer at each packet processing element 27. Accordingly, each packet processing element 27 that receives matching traffic via at least one underlying physical interface of the logical interface may be configured to police the matching traffic at the same global rate (e.g., rate 33) independently of any of the other packet processing elements 27 policing the matching traffic also at the same global rate (e.g., rate 33).

However, this is undesired, as the collective traffic-limiting rate being applied across all of the packet processing elements 27 will effectively be greater than the intended global traffic-limiting rate, thereby leading to a less restrictive rate-limiting rule than specified for the logical interface. As one illustrative example of this issue, for a logical interface and a particular network flow, a policer traffic limiting rate as specified by traffic policy might be 100 Mbps. A first policer on a first packet processing element coupled to underlying physical interface(s) of the logical interface can reference and enforce this 100 Mbps traffic rate, while a second policer on a second packet processing element coupled to additional underlying physical interface(s) of the logical interface also references and enforces this 100 Mbps traffic rate. Accordingly, the first and second policers will collectively enforce an effective traffic-limiting rate of 200 Mbps, which is less restrictive than the 100 Mbps traffic rate intended by the network policy (e.g., thereby allowing more traffic through than intended).

Figure 4:
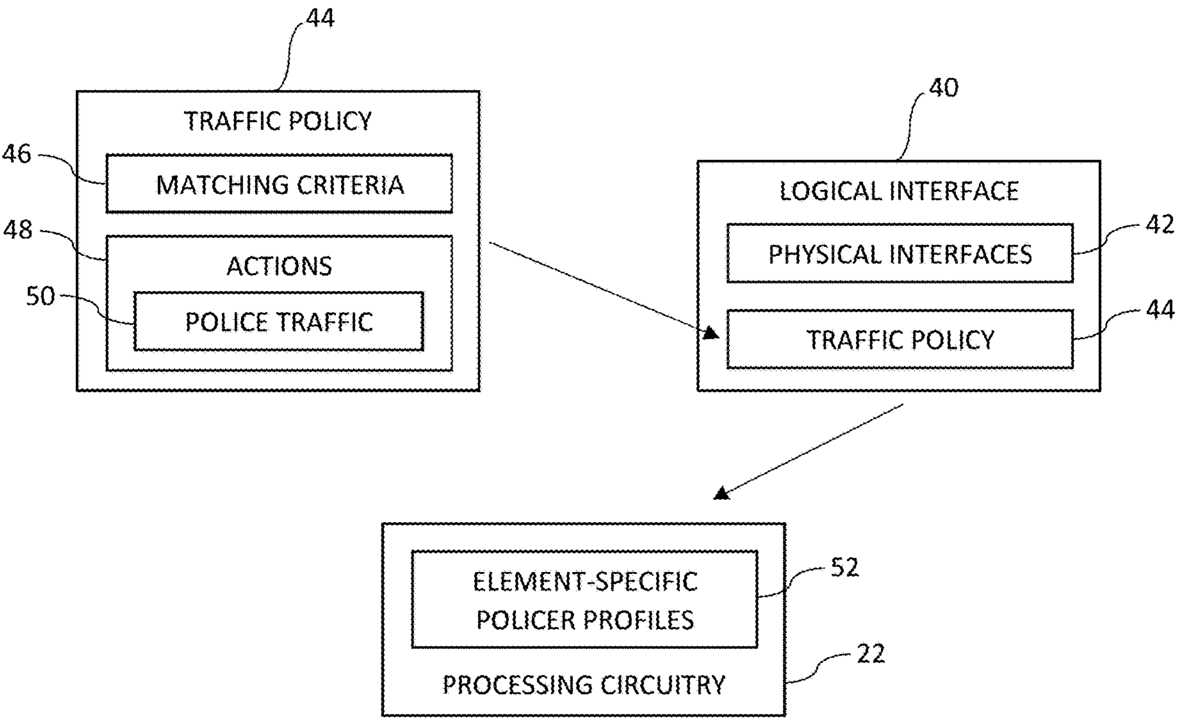
FIG. 4 is a diagram of illustrative processing circuitry configured to obtain packet-processing-element-specific policer profiles in accordance with some embodiments.

It may therefore be desirable to provide a network device 10 configured to apply a traffic policy for a logical interface in the intended manner (e.g., to rate-limit per the traffic rate defined in the rate-limiting action of a traffic policy rule). FIG. 4 is a diagram of illustrative processing circuitry configured to obtain (e.g., generate) packet-processing-element-specific policer profiles to facilitate appropriate application of traffic policy for a logical interface.

In the example of FIG. 4, control plane processing circuitry 22 (FIG. 2) may obtain configuration information for a logical interface 40 (e.g., from user input, from a configuration file, etc.). As examples, logical interface 40 may be a port channel interface, a port channel subinterface, a switch virtual interface, or any other type of Layer 2 or Layer 3 logical interface. As part of the configuration information of logical interface 40, processing circuitry 22 may obtain underlying physical interfaces 42 (or indications thereof) on which logical interface 40 is defined and configured (e.g., formed).

Processing circuitry 22 may further obtain a traffic policy 44 and an indication that traffic policy 44 be applied to logical interface 40 (e.g., from user input, from a configuration file, etc.). Traffic policy 44 as obtained by processing circuitry 22 may include one or more traffic policy rules each defined by one or more matching criteria 46 and one or more actions 48 to be performed on network traffic matching the one or more matching criteria 46. In illustrative configurations described herein as an example, the one or more actions 48 may include one or more traffic policing or policer actions 50. The one or more matching criteria 46 may specific header fields in received network traffic (e.g., packets) and corresponding values for these header fields, and/or other information, that identifies one or more corresponding network flows of interest. The one or more matching criteria 46 may specify matching values for source and/or destination Media Access Control (MAC) addresses, source and/or destination Internet Protocol (IP) addresses, Layer 4 (L4) protocol, source and/or destination L4 ports, etc., as just a few examples.

In order to apply some traffic policy rules such as a traffic policy rule specifying traffic policing action(s) 50 to be applied to a logical interface such as logical interface 40, processing circuitry 22 may obtain (e.g., generate) packet-processing-element-specific traffic policy profiles such as packet-processing-element-specific policer profiles 52 (where the traffic policy rule being applied includes policer action(s) 50). Packet-processing-element-specific policer profiles 52 may sometimes be referred to as processing-element-specific policer profiles 52 or element-specific policer profiles 52.

To obtain processing-element-specific traffic policy profiles (e.g., profiles 52), processing circuitry 22 may identify physical interfaces 42 (e.g., physical ports, or Ethernet interfaces 28 configured on physical ports) on which logical interface 40 is configured and may identify the distribution of physical interfaces 42 across (e.g., coupled across) packet processing elements 27 of packet processor(s) 26. In particular, each packet processing element 27 may be coupled to a set of one or more physical interfaces 42 and may be configured to handle (e.g., process, police, rate-limit, etc.) network traffic received from the coupled physical interface (s) 42. Based on the identified distribution of physical interfaces 42 relative to packet processing elements 27, processing circuitry 22 may generate appropriate packet-processing-element-specific traffic policy profiles (e.g., profiles 52) to enforce the intended traffic policy rule(s) independently at packet processing elements 27 to collectively impart the desired behavior (e.g., the intended behavior when the traffic policy rule(s) are applied to logical interface 40).

As one illustrative example, one or more physical interfaces 42 may be coupled to a first packet processing element 27 configured to process traffic received on the one or more physical interfaces 42. One or more additional physical interfaces 42 may be coupled to a second packet processing element 27 configured to process traffic received on the one or more additional physical interfaces 42. Accordingly, processing circuitry 22 may generate policer profiles 52 for the first and second packet processing elements 27, rather than configuring both packet processing elements 27 with the same global policer profile (e.g., a global policer profile directly generated from a traffic policy rule when the distribution of physical interfaces 42 with respect to multiple packet processing elements 27 is not considered). This example is merely illustrative. In general, any number of interface(s) may be distributed across (e.g., with respect to) any number of packet processors 27.

By obtaining packet-processing-element specific traffic policy profiles, processing circuitry 22 may allocate and configure resources (e.g., set by traffic policy rules and actions defined therein) for packet processing elements 27 in a packet-processing-element-specific manner. This is in contrast to globally allocating and configuring packet processing elements 27 directly based on the traffic policy action(s). In the example of FIG. 4, the resource for allocation may be the traffic-limiting rate or the traffic rate for rate-limiting (e.g., the bandwidth allocated for traffic of a particular network flow to pass through and/or be output by packet processing element 27). In other examples, the resource for allocation may include other parameters (e.g., specified in traffic policy actions).

Based on processing circuitry 22 receiving configuration information input indicative of logical interface 40 and its underlying interfaces 42 and receiving configuration information input indicative of traffic policy 44 (e.g., specifying a traffic policy rule that contains a policing action 50 for a network flow matching one or more criteria 46 of the policy rule) being applied to logical interface 40, processing circuitry 22 may identify the distribution of the (total or globally allocated) bandwidth for the traffic-limiting across underlying interfaces 42 and/or across packet processing elements 27 coupled to the underlying interfaces 42. Processing circuitry 22 may obtain specific traffic policy profiles (e.g., policer profiles 52) for each of the relevant packet processing elements 27 (e.g., each packet processing element 27 coupled to at least one underlying interface 42 of logical interface 40) that contains the allocation of the (total or globally allocated) bandwidth for the traffic-limiting for each of the relevant packet processing elements 27.

If desired, some of the obtained specific traffic policy profiles may be for (e.g., shared between, applied to, referenced by, etc.) multiple of the packet processing elements 27, if the same profile is applicable to multiple packet processing elements 27.

If desired, processing circuitry 22 may still obtain and maintain a global traffic policy profile (e.g., a global policer profile having the global or total traffic-limiting rate) that is associated with logical interface 40 as applied with traffic policy 44. Processing circuitry 22 may convert this global profile to the multiple processing-element-specific policer profiles that cumulatively achieve the behavior intended by the global profile for logical interface 40.

After obtaining the packet-processing-element-specific traffic policy profiles (e.g., profiles 52), processing circuitry 22 may use these packet-processing-element-specific traffic policy profiles to configure packet processing elements 27. In particular, each of the processing-element-specific policer profiles 52 may be associated with and used to configure at least one corresponding policer on a respective packet processing element 27 (instead of a global profile being used as described the example of FIG. 3, which can lead to undesired behavior).

Figure 5:
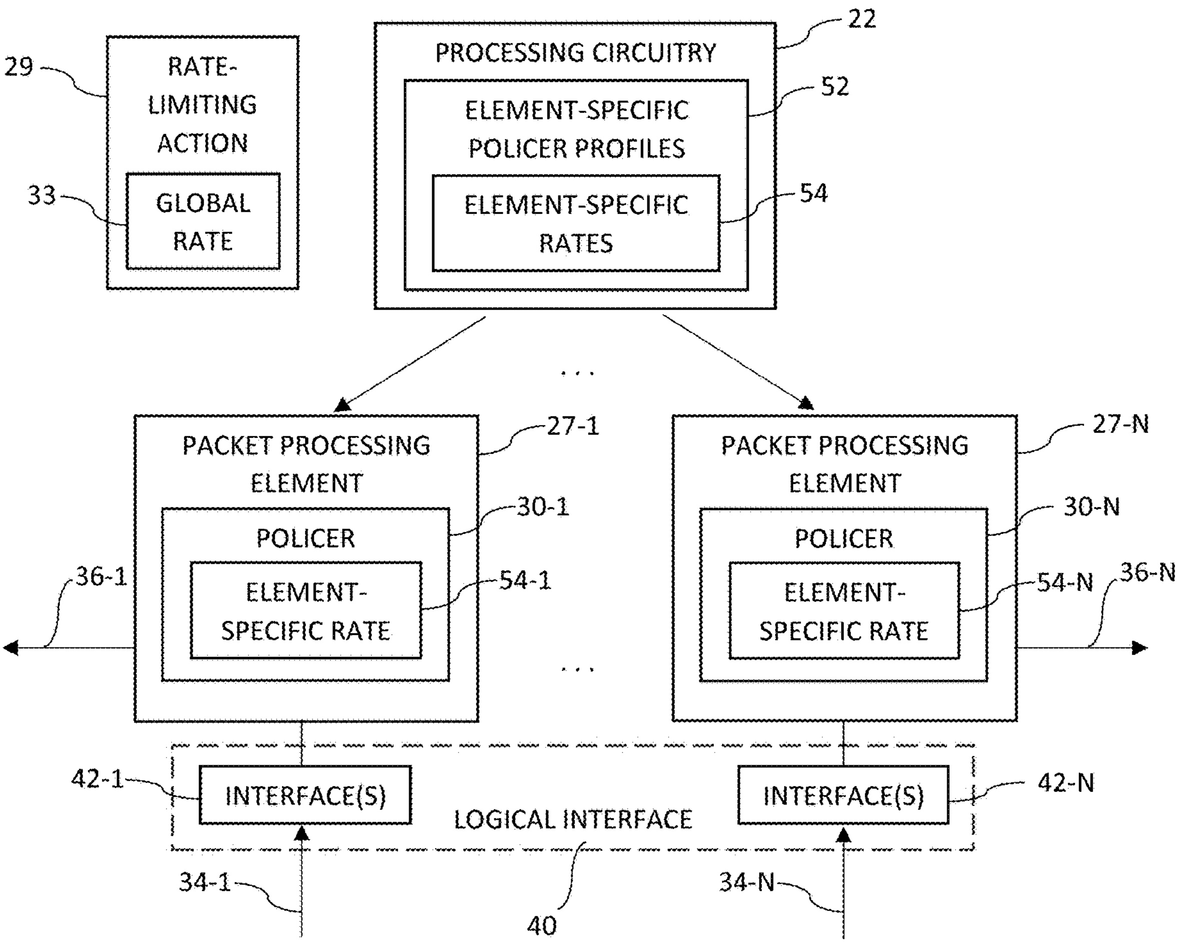
FIG. 5 is a diagram of illustrative packet processing elements configured to police network traffic based on packet-processing-element-specific policer profiles in accordance with some embodiments.

FIG. 5 is a diagram of illustrative processing circuitry (e.g., control plane processing circuitry 22) configured to implement a traffic policy for a logical interface by configuring packet processing elements using processing-element-specific traffic policy profiles. In particular, as shown in FIG. 5, control plane processing circuitry 22 may obtain (e.g., generate) packet-processing-element-specific policer profiles 52 (e.g., in the manner described in connection with FIG. 4 when applying traffic policy 44 to logical interface 40).

In the example of FIG. 5, the obtained processing-element-specific policer profiles 52 may each include a corresponding processing-element-specific traffic-limiting rate 54. Processing-element-specific traffic-limiting rates 54 may be obtained based on global rate 33 specified in rate-limiting action 29 (e.g., one of actions 48 or 50 in FIG. 4) of a particular policy rule in traffic policy 44 being applied to logical interface 40 and based on the distribution of physical interfaces 42 coupled to packet processing elements 27 (referring to two or more packet processing elements 27-1, . . . , 27-N in FIG. 5).

In particular, packet processing element 27-1 may configure or otherwise implement policer 30-1 thereon based on a selected one of the element-specific policer profiles 52 and may therefore obtain the element-specific traffic-limiting rate 54-1 of the selected policer profile 52 for use by policer 30-1 to enforce traffic-limiting rate 54-1 for matching traffic received by packet processing element 27-1. In general, any packet processing element 27-N may configure or otherwise implement policer 30-N thereon based on a selected one of the element-specific policer profiles 52 and may therefore obtain the element-specific traffic-limiting rate 54-N of the selected policer profile 52 for use by policer 30-N to enforce to element-specific traffic-limiting rate 54-N for matching traffic received by packet processing element 27-N. Any suitable number, N, of packet processing elements 27 may be coupled to physical interface 42 collectively forming logical interface 40.

Accordingly, each packet processing element 27 may independently enforce its corresponding traffic-limiting rate 54 for traffic received on one or more physical interface(s) 42 forming logical interface 40 and coupled to that packet processing element 27.

As described above, each element-specific traffic-limit rate 54 may be determined by splitting the bandwidth of global rate 33 in a desired manner. In some illustrative configurations described herein as an example, each element-specific traffic-limiting rate 54 may receive a portion of the bandwidth corresponding to a portion of the underlying physical interfaces 42 for which that packet processing element 27 handles traffic. In this context, global rate 33 may sometimes be referred to as an overall (traffic or traffic-limiting) rate that may be split into the specific (traffic or traffic-limiting) rates.

Consider as an example an illustrative scenario in which logical interface 40 is formed from three underlying physical interfaces such as two physical interfaces 42-1 coupled to packet processing element 27-1 and one physical interface 42-N coupled to packet processing element 27-N. Element-specific traffic-limiting rate 54-1 may be determined by control plane processing circuitry 22 to be two-thirds of global rate 33 (e.g., a ratio of the two underlying interfaces 42-1 coupled to packet processing element 27-1 to the three total underlying interfaces 42 of logical interface 40) and element-specific traffic-limiting rate 54-N may be determined by control plane processing circuitry 22 to be one-third of global rate 33 (e.g., a ratio of the one underlying interface 42-N coupled to packet processing element 27-N to the three total underlying interfaces 42 of logical interface 40).

In general, a ratio of the element-specific traffic rate 54 for a given packet processing element 27 to the global rate 33 may be equal to the ratio of the number of underlying interfaces coupled to the given packet processor 27 to the total number of underlying interfaces 42 for the logical interface 40. In such a manner, each element-specific traffic rate 54 may be less than global rate 33. In fact, the sum of any combination of the element-specific traffic rates 54 may be equal to or less than the global rate 33 (e.g., a sum of all of the element-specific traffic rates 54 may be equal to the global rate 33). In such a manner, the element-specific traffic rates may collectively implement the traffic policy in the intended manner for the logical interface.

If desired, the allocation of traffic-limiting bandwidth (e.g., rates 54) to different policer profiles 52 may be based on (actual and/or predicted) traffic load of matching traffic being or to be handled by the corresponding packet processing element 27, may be based on any other heuristic, may be based on user configuration, etc. As desired, the allocation of traffic-limiting bandwidth (e.g., rates 54) to different policer profiles 52 (while the logical interface and its underlying physical interfaces remain unchanged) may be fixed over time, or may change over time (e.g., be dynamic), e.g., as traffic load between packet processing elements 27 and/or as the number of coupled physical interfaces 42 of the logical interface for any of packet processing elements 27 changes (e.g., due to changes in logical interface configuration or membership). Control plane processing circuitry 22 may adjust (or fix) rates 54 for policer profiles 52, as desired, and may configure each packet processing element 27 in the corresponding manner (e.g., to provide the corresponding policer 30 on each packet processing element 27 that enforces the corresponding rate 54 for that packet processing element 27).

Packet processing elements 27 may be distributed in any suitable manner across different packet processors 26. In particular, each packet processor 26 may be implemented as an integrated circuit die and/or an integrated circuit die packet. Each packet processor 26 may be formed with any suitable number of processing units or processing cores, some or all of which may be configured to perform packet processing, thereby forming packet processing elements 27. In general, any pair of packet processing elements 27 described in connection with FIG. 5 may be implemented as a pair of packet processing cores on the same packet processor 26 (e.g., on the same integrated circuit die) or may be implemented as separate packet processing cores on two different packet processors 26 (e.g., on two different integrated circuit dies).

Packet processing element 27-1 may receive matching traffic 34-1 (e.g., traffic satisfying one or more criteria 46 and is therefore in a corresponding network flow for policing) via physical interface(s) 42-1 (e.g., a subset of physical interface(s) coupled to packet processing element 27-1 on which logical interface 40 is configured). Policer 30-1 implemented on packet processing element 27-1 may rate-limit received traffic 34-1 (e.g., by selectively dropping a portion of received traffic 34-1) such as output traffic 36-1 satisfies element-specific rate 54-1. In general, packet processing element 27-N may receive matching traffic 34-N (e.g., traffic satisfying one or more criteria 46 and is therefore in a corresponding network flow for policing) via physical interface(s) 42-N (e.g., a subset of physical interface(s) coupled to packet processing element 27-N on which logical interface 40 is configured). Policer 30-N implemented on packet processing element 27-N may rate-limit received traffic 34-N (e.g., by selectively dropping a portion of received traffic 34-N) such that output traffic 36-N satisfies element-specific rate 54-N.

Figure 6:
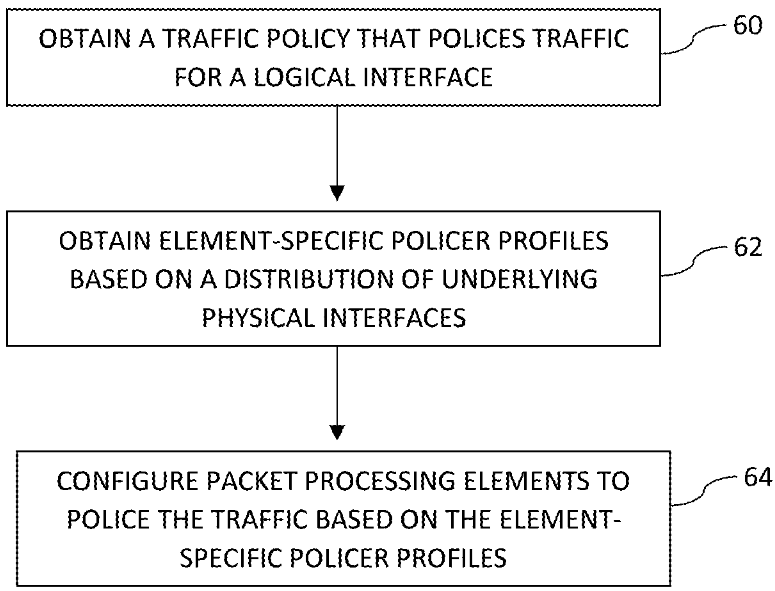
FIG. 6 is a flowchart of illustrative operations for applying a traffic policy for a logical interface in accordance with some embodiments.

FIG. 6 is a flowchart of illustrative operations for applying traffic policy to a logical interface. Configurations in which the operations described in connection with FIG. 6 are performed by one or more network devices 10 of network 8 (e.g., as described in connection with FIGS. 1-5) are sometimes described herein as illustrative examples. If desired, other suitable computing devices in the networking system of FIG. 1 may similarly perform some or all of the operations described in connection with FIG. 6.

The illustrative operations described in connection with FIG. 6 may generally be performed using respective processing circuitry (e.g., one or more processors) by a computing device (e.g., a network device 10) by executing, on the processing circuitry, software instructions stored on corresponding memory circuitry (e.g., non-transitory computer-readable storage media) of the computing device. If desired, other dedicated hardware components (e.g., other components of device 10) may perform some or all of the operations described in connection with FIG. 6.

At block 60, one or more processors (e.g., control plane processing circuitry 22 when executing software instructions for traffic policy management and/or policer management processes) obtain a traffic policy that polices traffic for a logical interface. The traffic policy may define one or more policers actions to be performed on one or more network flows (identified by corresponding matching criteria). The policer actions may include traffic rate-limiting action(s) based on corresponding policy (overall) traffic-limiting rates or may include other policer actions. While the rate-limiting the output of matching traffic as policer actions are sometimes described herein as examples, these examples are merely illustrative. The embodiments described herein (e.g., with respect to obtaining packet-processing-element specific traffic policy profiles) may similarly be applicable to other types of (policer) actions.

At block 62, the one or more processors may obtain (e.g., generate) packet-processing-element-specific policer profiles based on a distribution of underlying physical interfaces of the logical interface. In particular, the one or more processors may determine a number of physical interfaces coupled to each packet processing element to allocate an overall policer parameter (e.g., a bandwidth for the overall traffic-limiting rate) across the different packet processing elements. Each of the packet-processing-element-specific policer profiles may include a corresponding allocation (portion) of the overall policer parameter (e.g., a packet-processing-element-specific traffic limiting rate allocated from the overall traffic-limiting rate).

At block 64, the one or more processors may configure packet processing elements to police the traffic based on the packet-processing-element-specific policer profiles. In particular, the one or more processors may implement policers on the packet processing elements using the packet-processing-element-specific policer profiles. For example, each policer may be configured to rate-limit to the packet processing element traffic-limiting rate specified in the corresponding packet-processing-element-specific policer profile. The implemented policers on each of the packet processing elements may police the matching traffic in a manner that collectively imparts the desired traffic policy behavior when applied to a local interface having underlying physical interfaces coupled to the packet processing elements.

The methods and operations described above in connection with FIGS. 1-6 may be performed by the components of the network device(s) (e.g., network device 10) or other computing equipment using software, firmware, and/or hardware (e.g., dedicated circuitry or hardware). Software code for performing these operations may be stored on non-transitory computer-readable storage media (e.g., tangible computer-readable storage media) stored on one or more of the components of the network device(s) or other computing equipment. The software code may sometimes be referred to as software, data, instructions, program instructions, or code. The non-transitory computer-readable storage media may include hard drives (electro-mechanical data storage devices), other non-volatile memory such as solid-state drives, non-volatile random-access memory (NVRAM), removable flash drives or other removable media, and/or volatile memory such as random-access memory or other types of volatile memory. Software stored on the non-transitory computer-readable storage media may be executed by processing circuitry on the network device(s) or other computing equipment.

The foregoing is merely illustrative and various modifications can be made to the described embodiments. The foregoing embodiments may be implemented individually or in any combination.

What is claimed is:

1. A network device comprising:

a first set of one or more physical interfaces coupled to a first packet processing element;

a second set of one or more physical interfaces coupled to a second packet processing element, wherein the first and second sets of physical interfaces are configured to at least partly form a logical interface;

memory circuitry; and processing circuitry coupled to the memory circuitry and configured to:

obtain a traffic policy applied to the logical interface;

generate one or more processing-element-specific traffic policy profiles based on the traffic policy;

apply one of the one or more processing-element-specific traffic policy profiles to the first packet processing element, wherein the processing-element-specific traffic policy profile applied to the first packet processing element is generated based on a number of physical interfaces in the first set forming the logical interface; and apply one of the one or more processing-element-specific traffic policy profiles to the second packet processing element, wherein the processing-element-specific traffic policy profile applied to the second packet processing element is generated based on a number of physical interfaces in the second set forming the logical interface.

2. The network device defined in claim 1, wherein the traffic policy comprises one or more matching criteria for matching network traffic and one or more actions to be performed on the matching network traffic, wherein the one or more actions comprise a policer action, and wherein the one or more processing-element-specific traffic policy profiles comprise one or more processing-element-specific policer profiles.

3. The network device defined in claim 2, wherein the processing-element-specific traffic policy profile applied to the first packet processing element is a first processing-element-specific traffic policy profile in the one or more processing-element-specific traffic policy profiles, wherein the processing-element-specific traffic policy profile applied to the second packet processing element is a second processing-element-specific traffic policy profile in the one or more processing-element-specific traffic policy profiles, and wherein the processing circuitry is configured to:

implement a first policer on the first packet processing element based on the first processing-element-specific traffic policy profile; and implement a second policer on the second packet processing element based on the second processing-element-specific traffic policy profile.

4. The network device defined in claim 3, wherein the policer action in the traffic policy comprises a traffic rate-limiting action to an overall traffic rate, wherein the processing circuitry is configured to implement the first policer to rate-limit the matching network traffic to a first specific traffic rate less than the overall traffic rate based on the first processing-element-specific traffic policy profile, and wherein the processing circuitry is configured to implement the second policer to rate-limit the matching network traffic to a second specific traffic rate less than the overall traffic rate based on the second processing-element-specific traffic policy profile.

5. The network device defined in claim 1, wherein the first set of one or more physical interfaces comprises first and second physical interfaces coupled to the first packet processing element and forming the local interface, wherein the second set of one or more physical interfaces comprises a third physical interface coupled to the second packet processing element and forming the local interface, and wherein the processing circuitry is configured to generate the one or more processing-element-specific traffic policy profiles based on a distribution of the first, second, and third physical interfaces across the first and second packet processing elements.

6. The network device defined in claim 5, wherein the traffic policy identifies an overall traffic rate to which matching network traffic received on the logical interface is to be limited, wherein the one or more processing-element-specific traffic policy profiles include a first processing-element-specific traffic policy profile for the first packet processing element that identifies a first additional traffic rate to which the matching network traffic received on the first and second physical interfaces is to be limited, and wherein the one or more processing-element-specific traffic policy profiles include a second processing-element-specific traffic policy profile for the second packet processing element that identifies a second additional traffic rate to which the matching network traffic received on the third physical interface is to be limited.

7. The network device defined in claim 6, wherein the first additional traffic rate is greater than the second additional traffic rate and wherein a sum of the first and second additional traffic rates is less than or equal to the overall traffic rate.

8. The network device defined in claim 7, wherein a ratio of the first additional traffic rate to the overall traffic rate is equal to a ratio of a number of physical interfaces forming the logical interface coupled to the first packet processing element to a number of all physical interfaces configured to form the logical interface and wherein a ratio of the second additional traffic rate to the overall traffic rate is equal to a ratio of a number of physical interfaces forming the logical interface coupled to the second packet processing element to the number of all physical interfaces configured to form the logical interface.

9. The network device defined in claim 1, wherein the first set of one or more physical interfaces comprises a first physical port forming a first Ethernet interface and wherein the second set of one or more physical interfaces comprises a second physical port forming a second Ethernet interface.

10. The network device defined in claim 1, wherein the logical interface comprises a Layer 2 logical interface or a Layer 3 logical interface.

11. The network device defined in claim 1, wherein the logical interface comprises a port channel interface, a port channel subinterface, or a switch virtual interface.

12. The network device defined in claim 1, wherein the first packet processing element comprises a first packet processing core of a packet processor and wherein the second packet processing element comprises a second packet processing core of the packet processor.

13. The network device defined in claim 1, wherein the first packet processing element comprises a packet processing core of a first packet processor and wherein the second packet processing element comprises a packet processing core of a second packet processor.

14. The network device defined in claim 1, wherein the processing circuitry is configured to determine the processing-element-specific traffic policy profile applied to the first packet processing element by determining a given traffic-limiting rate for the first packet processing element based on an overall traffic rate specified by the traffic policy and based on the number of physical interfaces in the first set of one or more physical interfaces coupled to the first packet processing element and forming the logical interface.

15. A network device comprising:

first and second ports that at least partly form a logical interface;

a first packet processing element coupled to the first port;

a second packet processing element coupled to the second port;

memory circuitry; and processing circuitry coupled to the memory circuitry and configured to:

apply a traffic policy that specifies a traffic-limiting rate to the logical interface;

obtain a first processing-element-specific traffic-limiting rate for the first packet processing element based on the traffic-limiting rate for the logical interface and based on a configuration of the logical interface relative to the first packet processing element; and obtain a second processing-element-specific traffic-limiting rate for the second packet processing element based on the traffic-limiting rate for the logical interface and based on a configuration of the logical interface relative to the second packet processing element, wherein the first processing-element-specific traffic-limiting rate is obtained based on a ratio of a number of ports coupled to the first packet processing element that at least partly forms the logical interface to a total number of ports forming the logical interface and wherein the second processing-element-specific traffic-limiting rate is obtained based on a ratio of a number of ports coupled to the second packet processing element that at least partly forms the logical interface to the total number of ports forming the logical interface.

16. The network device defined in claim 15, wherein a sum of the first and second processing-element-specific traffic-limiting rates is less than or equal to the traffic-limiting rate specified by the traffic policy.

17. The network device defined in claim 15, wherein the first packet processing element is configured to apply the first processing-element-specific traffic-limiting rate to one or more ports coupled to the first packet processing element, including the first port, that form the logical interface and wherein the second packet processing element is configured to apply the second processing-element-specific traffic-limiting rate to one or more ports coupled to the second packet processing element, including the second port, that form the logical interface.

18. The network device defined in claim 17, wherein a third port at least partly forms the logical interface and is coupled to the second packet processing element and wherein the second processing-element-specific traffic-limiting rate is greater than the first processing-element-specific traffic-limiting rate.

19. One or more non-transitory computer-readable storage media comprising computer-executable instructions that, when executed by one or more processors in a network device, cause the one or more processors to:

obtain a traffic policy that polices traffic for a logical interface formed from underlying physical interfaces, wherein the traffic policy identifies an overall traffic rate for rate-limiting the traffic received for the logical interface;

obtain first and second packet-processing-element-specific policer profiles for first and second packet processing elements, respectively, by determining, for the first packet-processing-element-specific policer profile, a first traffic rate for rate-limiting a first portion of the traffic received for the logical interface by the first packet processing element based on the overall traffic rate and based on a number of the underlying physical interfaces forming the logical interface and coupled to the first packet processing element, and determining, for the second packet-processing-element-specific policer profile, a second traffic rate for rate-limiting a second portion of the traffic received for the logical interface by the second packet processing element based on the overall traffic rate and based on a number of the underlying physical interfaces forming the logical interface and coupled to the second packet processing element, wherein the first and second traffic rates are each less than the overall traffic rate identified by the traffic policy; and configure the first and second packet processing elements to police the traffic based on the first and second packet processing elements specific policer profiles, respectively.

20. The one or more non-transitory computer-readable storage media defined in claim 19, wherein the first traffic rate is determined based on a ratio of the number of the underlying physical interfaces forming the logical interface and coupled to the first packet processing element to a total number of the underlying physical interfaces forming the logical interface and wherein the second traffic rate is determined based on a ratio of the number of the underlying physical interfaces forming the logical interface and coupled to the second packet processing element to the total number of the underlying physical interfaces forming the logical interface.

* * * * *